United States Patent Office 3,345,044
Patented Oct. 3, 1967

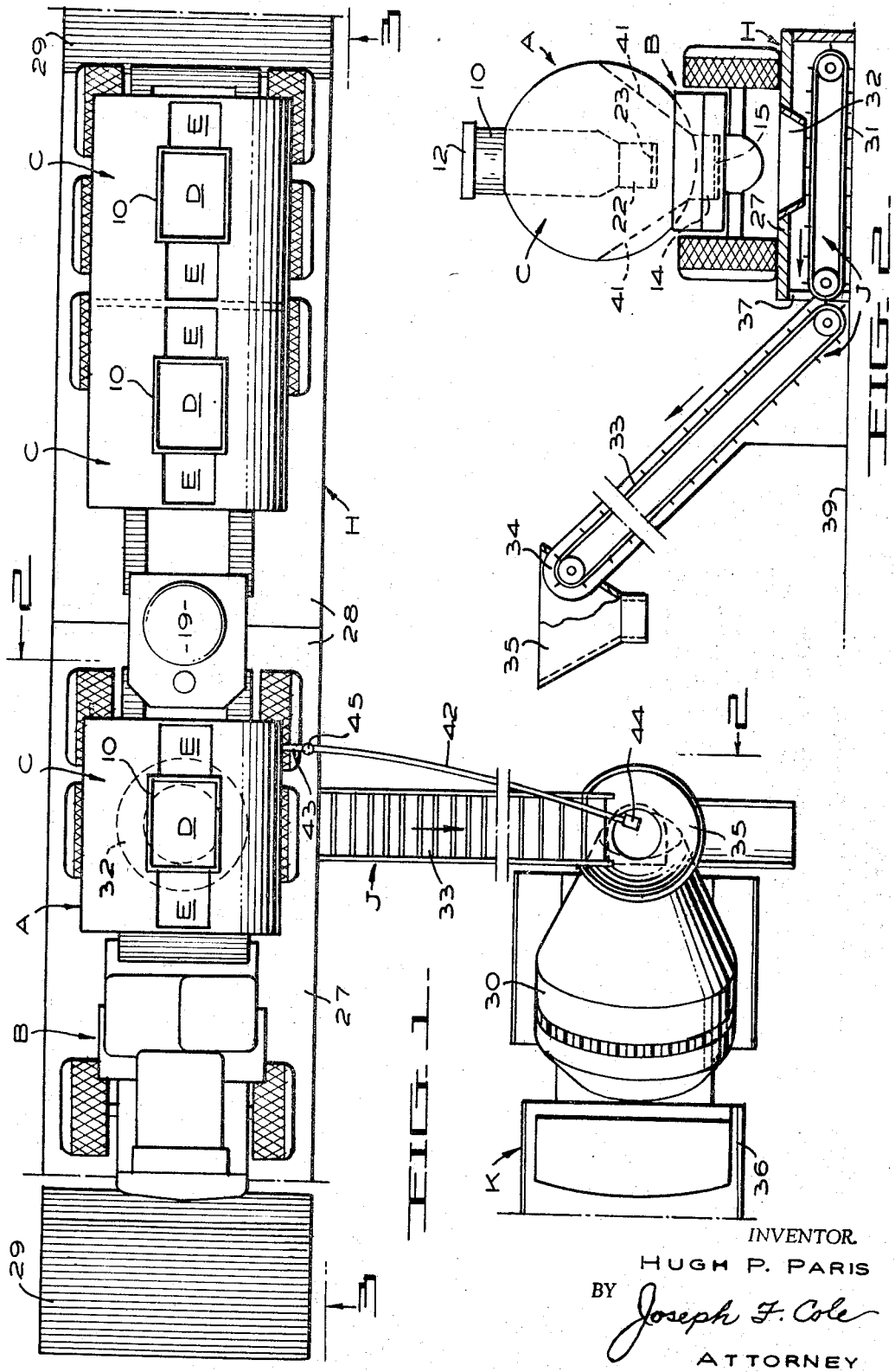

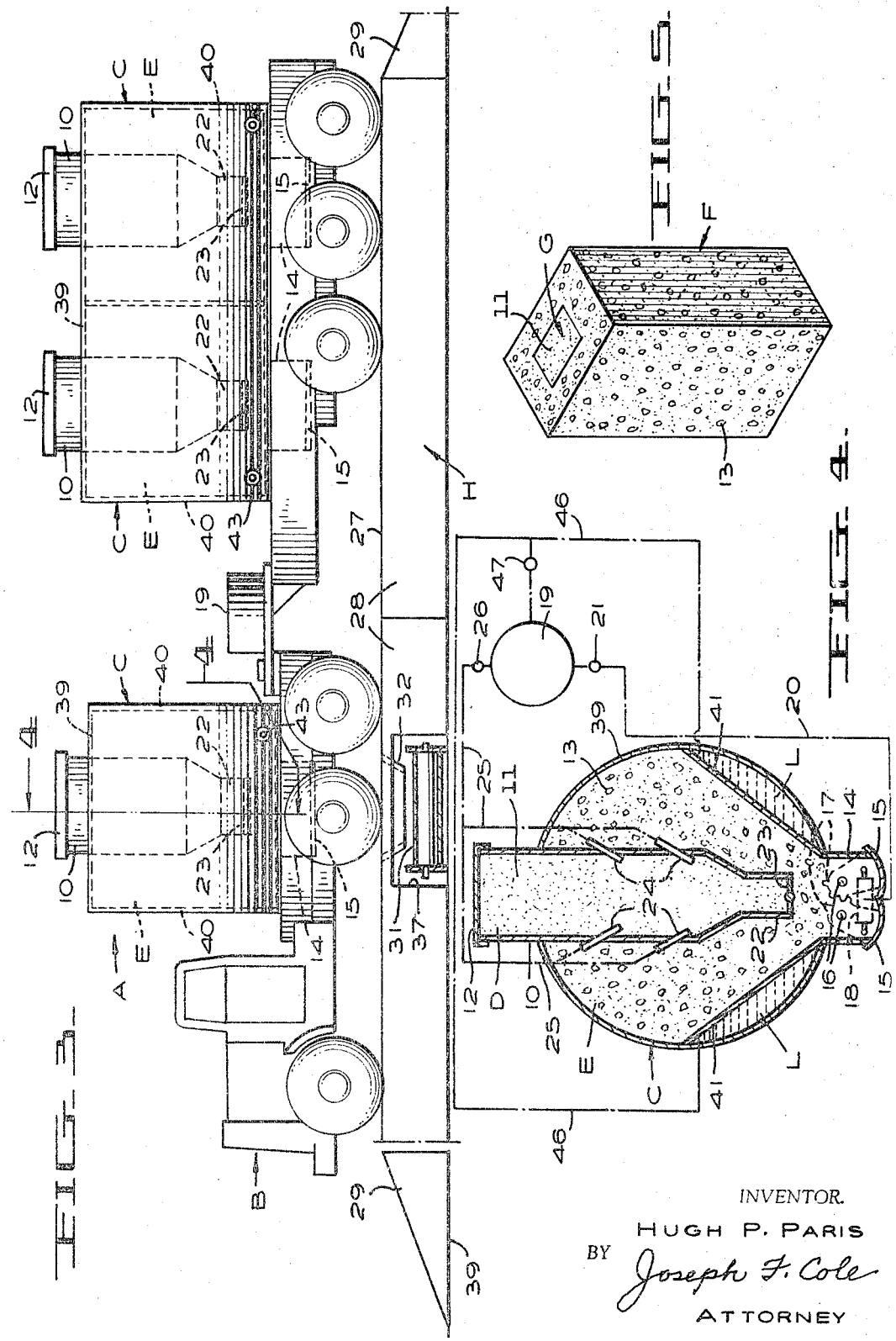

3,345,044
METHOD OF AND TRANSIT APPARATUS FOR DELIVERING CONCRETE MATERIALS
Hugh P. Paris, 1034 Colorado Ave., Palo Alto, Calif. 94303
Filed Feb. 17, 1967, Ser. No. 616,982
8 Claims. (Cl. 259—164)

ABSTRACT OF THE DISCLOSURE

A method of and transit apparatus for delivering concrete materials in which large quantities of aggregate and dry cement are stored separately in a transit batchor and moved to a vicinity of a job site, the aggregate then being formed into a hollow sleeve and the hollow portion of the sleeve being filled with the dry cement as the sleeve is formed, providing a cement core in the aggregate sleeve. This material is then transferred to a rotatable mixing drum of a transit mixer and moved by the latter to the job site, the contents of the dry comparted design concrete mix in a container on the transit batchor being the charge for the mixing drum on the transit mixer.

Background of the invention

It is a common practice at the present time to provide a tower in which aggregate and cement are stored separately; and after these materials are weighed, they are discharged into a rotatable drum of a transit mixer for movement to a job site, often requiring the transit mixer to travel several miles from the tower plant to the job site and thus tying up the transit mixer for considerable periods of time and congesting highways with the travel.

Summary

An object of my invention is to provide a transit batchor having a truck on which one or more large containers are mounted, each container having compartments therein for the separate storage of aggregate and dry cement materials, whereby a large amount of the materials may be transported to the vicinity of a job site. Upon arrival, the aggregate is automatically formed into a hollow sleeve and the dry cement is introduced into the hollow portion of the sleeve as the materials are discharged from the transit batchor container.

The concrete materials discharged from the transit batchor are moved by a material-transfer mechanism and placed in a rotatable drum on a transit mixer, and when water is added to these materials, the drum intermixes the materials into concrete. The capacity of each container on the transit batchor is the designed mix for the transit mixer at the job in strength and volume, the same as if the transit mixer had taken the charge from the batching plant with its return trip.

Brief description of the drawings

For a better understanding of the invention, reference should be had to the accompanying drawings, forming part of this specification, in which:

FIG. 1 is a top plan view of my transit apparatus for delivering concrete materials;

FIG. 2 is a transverse sectional view taken along the line 2—2 of FIG. 1;

FIG. 3 is a longitudinal sectional view taken along the plane 3—3 of FIG. 1;

FIG. 4 is a transverse sectional view taken along the vertical plane 4—4 of FIG. 3; and FIG. 5 is an isometric view of a hollow aggregate sleeve having the hollow portion thereof filled with dry cement to provide a cement core for the sleeve.

Description of the preferred embodiment

Referring now to the drawings in detail, a transit batchor A is provided and it includes a large truck designated generally at B. Of course, this truck may be of the semi-trailer type, as shown in FIGS. 1 and 3, or it may be a truck having a trailer coupled thereto. One or more containers C are mounted on this truck for being moved from a plant supplying cement materials to the vicinity of a job site, and the drawings show three of these containers, each having a large capacity, whereby a single trip of the transit batchor A will provide a considerable supply of the concrete materials near the job site.

Each container C is identical with the other containers and a description of one will suffice for all.

It will be noted that the container C has a shell 10 carried thereby and extending downwardly thereinto, the shell defining a compartment D having dry cement 11 stored in bulk therein (see FIG. 4). This shell has a cover 12 mounted over its top so as to prevent rain or moisture from gaining access to the stored cement.

The container C defines a compartment E surrounding the cement-containing shell 10, and the container compartment having aggregate 13 stored in bulk state therein (see FIG. 4). A flow-controlled outlet chute 14 communicates with the container compartment E, whereby aggregate 13 may outflow downwardly through this outlet chute.

Of course, any suitable means may be provided for controlling the outflow of the aggregate 13 through the outlet chute 14. For this purpose, a pair of clam-shell gates 15 have been shown in FIG. 4, each gate being swingably supported on a rod 16. Gear segments 17 are formed on these gates at their tops and intermesh with one another so that the gates must move together toward and away from one another. An air cylinder 18 is connected to these gates to operate the latter in opening and closing movements, and compressed air may be delivered from an air tank 19 through a conduit 20 to the cylinder 18, the flow of air through this conduit being controlled by a valve 21, as shown in FIG. 4.

The shell 10 is provided with a flow-controlled discharge chute 22 at its bottom that is spaced from the outlet chute 14 of the container C so that aggregate 13 may pass therebetween, whereby dry cement 11 from the shell 10 may be fed into the aggregate in a descending stream. A butter-fly valve 23 has been shown for controlling outflow of the dry cement through the discharge chute 22 (see FIG. 4).

As the aggregate 13 descends from the outlet chute 14, the aggregate will form a hollow sleeve F of aggregate (see FIG. 5), and the hollow portion of the aggregate sleeve will be filled with dry cement 11 to provide a cement core G therein. The forming of the aggregate sleeve F and descending of the latter will take place with filling of the hollow portion of the sleeve with the cement and both taking place simultaneously, the cement forming a descending stream. As shown in FIG. 5, the aggregate sleeve F encases and surrounds the dry cement 11 to prevent the latter from polluting the air.

It will be seen from FIG. 4 that air nozzles 24 are arranged in the shell compartment D, and compressed air from the tank 19 is conveyed through conduits 25 to these nozzles so as to inject jets of the compressed air into the dry cement 11 to fluff the cement. These nozzles are inclined so as to direct the fluffed cement towards the discharge chute 22. A valve 26 has been provided in the conduits 25 to control flow of air therethrough.

As shown in FIGS. 1 and 3 of the drawings, a portable ramp H has been provided, and this ramp has an elevated deck 27 over which the transit batchor truck B may be driven. This ramp is also shown in section in FIG. 2, and may be made in ramp sections 28 that are secured together on the site, and opposite end inclined ramp sections 29 may be provided, whereby the truck B may be driven onto and off the ramp.

A material-transfer mechanism J has been shown for moving the aggregate and cement to a rotatable mixing drum 30 of a transit mixer K, where the mixed concrete may be transported to the job site. As clearly shown, the capacity of each container C is the same as the capacity of the mixing drum. The cement and aggregate may remain in the containers C in a dry state until such time that these materials are to be transferred to the transit mixer K near the job site. It is well known that concrete in the mixing drum 30 will set-up or hardene, if the transit mixer is delayed while travelling from a batching plant to a job site. My arrangement overcomes this hazard.

The material-transfer mechanism J includes a conveyor 31 disposed under the deck 27 of the ramp H to receive aggregate 13 and dry cement 11 being discharged from the outlet chute 14 of the transit batchor container C. A funnel 32 is carried by the ramp deck 27 and is positioned to guide the aggregate and cement from the container outlet chute 14 to the conveyor 31 under the deck, as shown in FIGS. 2 and 3.

In FIGS. 1 and 2, an elevator conveyor 33 has been disclosed for moving the aggregate and cement deposited on the conveyor 31 to an upper elevated end 34 of this elevator conveyor. Moreover, a hopper 35 is arranged at the upper end of the elevator conveyor 33 to receive the transferred aggregate and cement, this hopper being arranged at a sufficient elevation so that the drum 30 on the transit mixer K and the truck 36 of the latter may be moved under the hopper to receive the aggregate and cement.

It will be observed from FIGS. 2 and 3 that an opening 37 is formed in the side of the portable ramp H through which conveyor 31 will transfer its load of aggregate and cement to the elevator conveyor 33.

As the aggregate sleeve F and its cement core G strike the conveyor 31 and is advanced along the latter and up the elevator conveyor 33, the aggregate 13 will spread out, and since the cement in the core G has been placed in the central part of the sleeve, this cement will spread out over the aggregate and intermix therewith.

Instead of providing the ramp H, a pit could be dug into the ground 39' and the conveyor 31 and the lower end of the elevator conveyor 33 placed therein.

The container C has an annular wall 39 and end walls 40 surrounding its compartment E, and a pair of sloping plates 41 are sealed to these walls 39 and 40 on the interior of the container, these plates being disposed on opposite sides of the outlet chute 14 of the container so as to guide the aggregate 13 downwardly into this chute (see FIG. 4), and then the aggregate will gravitate downwardly onto the conveyor 31 for transfer.

Also, the sloping plates 41 coact with the container walls 39 and 40 to define water-storage compartments L (see FIG. 4), and a hose 42 is made to be connected to outlet pipes 43 on the lower parts of the containers C for conveying water from the storage compartments L to the aggregate and cement materials as they move toward the mixing drum 30 of the transit mixer K. The upper end of this hose may have a nozzle 44 arranged in the hopper 35 so as to supply water to the aggregate and cement to form concrete when the materials are mixed in the rotatable drum 30. A valve 45 has been illustrated in FIG. 1 for regulating the flow of water through the hose.

The water compartment L may be pressurized by compressed air being delivered thereto by conduits 46 having valve 47 therein (see FIG. 4). This will cause the water to flow uphill to the nozzle 44 at the upper end of the hose 42.

What is claimed is:

1. In the method of delivering concrete materials, the steps of:

(a) charging and storing aggregate and dry cement in bulk state in separate compartments of a container mounted on a portable transit batchor, while the latter is located at a batching plant;

(b) moving the transit batchor with the aggregate and dry cement thus stored in their respective compartments from the batching plant to the vicinity of a job site;

(c) then transferring the bulk aggregate from its compartment in the transit batchor container while forming the aggregate into a hollow descending sleeve, and simultaneously transferring the bulk dry cement from its compartment in the transit batchor container and feeding the dry cement in a descending stream into the hollow portion of the aggregate sleeve to fill the latter with a cement core, the aggregate sleeve encasing and surrounding the cement core to prevent the latter from polluting the air.

2. The method of delivering concrete materials, as set forth in claim 1;

(d) and in which compressed air is discharged into the descending stream of dry cement to fluff the cement as it enters the aggregate sleeve.

3. In a transit apparatus for delivering concrete materials:

(a) a transit batchor comprising:
(1) a truck having at least one container mounted thereon for being moved thereby to the vicinity of a job site;
(2) a shell carried by the container and extending downwardly thereinto, the shell defining a compartment having dry cement stored in bulk therein;
(3) the container defining a compartment surrounding the cement-containing shell, and the container compartment having aggregate stored in bulk state therein;
(4) a flow-controlled outlet chute communicating with the container compartment, whereby aggregate may outflow downwardly through this outlet chute;
(5) the shell being provided with a flow-controlled discharge chute at its bottom that is spaced from the outlet chute of the container so that aggregate may pass therebetween, whereby dry cement from the shell may be fed into the aggregate in a descending stream;

(b) a transmit mixer comprising:
(1) a truck having a rotatable mixing drum mounted thereon into which the aggregate and cement may be transferred and transported by this truck to a job site;
(2) the capacity of the container compartment and cement-containing compartment being the same as the capacity of the transit mixing drum, whereby the batch of aggregate and cement may be transferred as a charge from the container to the drum;

(c) and a material-transfer mechanism for moving the descending aggregate and cement from the container outlet chute to the transit mixer drum.

4. The transit apparatus for delivering concrete materials as set forth in claim 3;

(d) and in which air nozzles are arranged in the shell compartment, and means are provided for injecting jets of compressed air through these nozzles into the dry cement to fluff the cement.

5. The transit apparatus for delivering concrete materials as set forth in claim 3;

(d) and in which the container has walls surrounding its compartment, and a pair of sloping plates are sealed to these walls on the interior of the container, these plates being disposed on opposite sides of the outlet chute of the container so as to guide the aggregate downwardly into this chute;

(e) the sloping plates coacting with the container walls to define water-storage compartments;

(f) and a hose made to be connected to the water-storage compartments for conveying water therefrom to the aggregate and cement materials as they move toward the mixing drum of the transit mixer.

6. The transit apparatus for delivering concrete materials as set forth in claim 3;

(d) and in which a portable ramp is provided, the ramp having an elevated deck over which the transit batchor truck may be driven;

(e) the material-transfer mechanism including a conveyor disposed under the deck to receive aggregate and cement being discharged from the outlet chute of the transit batchor container.

7. The transit apparatus for delivering concrete materials, as set forth in claim 6;

(f) and in which a funnel is carried by the ramp deck and is positioned to guide the aggregate and cement from the container outlet chute to the conveyor under the deck.

8. The transit apparatus for delivering concrete materials, as set forth in claim 6;

(f) and in which an elevator conveyor is provided for moving the aggregate and cement deposited on the conveyor under the deck to an upper elevated end of the elevator conveyor;

(g) a hopper provided at the upper end of the elevator conveyor to receive the transferred aggregate and cement, and this hopper being arranged at a sufficient elevation so that the drum on the transit mixer may be moved under the hopper to receive the aggregate and cement.

References Cited
UNITED STATES PATENTS

| | | | |
|---|---|---|---|
| 1,185,118 | 5/1916 | Michael | 259—147 |
| 2,138,172 | 11/1938 | Johnson | 259—149 |
| 2,958,107 | 11/1960 | Hartley | 259—149 |
| 3,251,484 | 5/1966 | Hagan | 214—2 |

ROBERT W. JENKINS, *Primary Examiner.*